United States Patent
Bilet et al.

(10) Patent No.: US 9,770,127 B2
(45) Date of Patent: Sep. 26, 2017

(54) DRY STEAM OVENS

(71) Applicant: Elwha LLC, Bellevue, WA (US)

(72) Inventors: Maxime Jean Jerome Bilet, Seattle, WA (US); Roderick A. Hyde, Redmond, WA (US); Muriel Y. Ishikawa, Livermore, CA (US); Jordin T. Kare, Seattle, WA (US); Nathan P. Myhrvold, Bellevue, WA (US); Tony S. Pan, Cambridge, MA (US); Nels R. Peterson, Bellevue, WA (US); Robert C. Petroski, Seattle, WA (US); Clarence T. Tegreene, Mercer Island, WA (US); Lowell L. Wood, Jr., Bellevue, WA (US); Victoria Y. H. Wood, Livermore, CA (US); Christopher Charles Young, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/850,494

(22) Filed: Sep. 10, 2015

(65) Prior Publication Data

US 2015/0374161 A1 Dec. 31, 2015

Related U.S. Application Data

(63) Continuation of application No. 13/742,982, filed on Jan. 16, 2013, now Pat. No. 9,149,058.

(51) Int. Cl.
*A47J 27/04* (2006.01)
*A47J 27/16* (2006.01)
*A23L 5/10* (2016.01)

(52) U.S. Cl.
CPC .............. *A47J 27/04* (2013.01); *A23L 5/13* (2016.08); *A47J 27/16* (2013.01); *A47J 2027/043* (2013.01)

(58) Field of Classification Search
CPC ...... A21B 1/36; A21B 1/42–1/48; A23L 5/13; F24C 15/003; A47J 2027/043; A47J 27/04; A47J 27/16; A47J 2202/00
(Continued)

(56) References Cited

U.S. PATENT DOCUMENTS 3,736,860 A * 6/1973 Vischer, Jr. ............ F24C 7/087
                                                              219/388
3,774,008 A    11/1973 Maniscalco
(Continued)

OTHER PUBLICATIONS

"How Does SuperSteam Work?"; Apr. 8, 2013; p. 1; Sharp Corporation of New Zealand; New Zealand; located at http://www.sharp.net.nz/articles/steam-ovens/supersteam-over/how-it-works/.
(Continued)

*Primary Examiner* — Drew Becker
(74) *Attorney, Agent, or Firm* — Foley & Lardner LLP

(57) ABSTRACT

An oven includes a support structure configured to support a food item having multiple cooking sites, a steam nozzle configured to direct a jet of dry steam onto the food item, and a control system configured to determine a targeted subset of the cooking sites in response to a cooking requirement of the food item and configured to dynamically control movement of the support structure or the steam nozzle to direct the jet of dry steam onto the targeted subset of cooking sites in response to the cooking requirement of the food item.

35 Claims, 4 Drawing Sheets

(58) Field of Classification Search
USPC .......... 426/510–511, 523, 233; 99/325–333, 99/468, 473, 477–479; 126/20–20.2; 219/401
See application file for complete search history.

(56) References Cited

U.S. PATENT DOCUMENTS

| | | | |
|---|---|---|---|
| 4,072,762 A | | 2/1978 | Rhodes |
| 4,655,192 A | | 4/1987 | Jovanovic |
| 4,734,554 A | | 3/1988 | Tateda et al. |
| 4,810,856 A | | 3/1989 | Jovanovic |
| 5,171,600 A | | 12/1992 | Young et al. |
| 5,361,681 A | * | 11/1994 | Hedstrom ............... F24C 7/087 219/413 |
| 5,407,692 A | | 4/1995 | Caridis et al. |
| 5,442,997 A | | 8/1995 | Branz et al. |
| 6,244,163 B1 | | 6/2001 | Lee |
| 6,365,210 B1 | | 4/2002 | Schaible et al. |
| 6,419,971 B1 | | 7/2002 | Mather et al. |
| 7,549,369 B2 | | 6/2009 | Zimmerman |
| 9,149,058 B2 | * | 10/2015 | Bilet ...................... A47J 27/16 |
| 2003/0008045 A1 | | 1/2003 | Mather et al. |
| 2004/0131738 A1 | | 7/2004 | Holm et al. |
| 2005/0112255 A1 | * | 5/2005 | Tottenham ........... A23B 7/0053 426/511 |
| 2005/0193901 A1 | | 9/2005 | Buehler |
| 2008/0102190 A1 | | 5/2008 | Trow |
| 2009/0007798 A1 | | 1/2009 | Yamaguchi et al. |
| 2009/0223383 A1 | * | 9/2009 | Houraney ........... A47J 36/2483 99/447 |
| 2013/0344208 A1 | * | 12/2013 | Singh .................... H05B 6/647 426/243 |
| 2013/0344214 A1 | | 12/2013 | Tong |
| 2014/0137857 A1 | | 5/2014 | Kwag et al. |
| 2016/0037958 A1 | * | 2/2016 | Freymiller .......... A47J 37/0611 426/233 |

OTHER PUBLICATIONS

"SuperSteam Oven"; Sharp Insight Pro Brochure; Dec. 17, 2008; p. 1-4; Sharp Electronics Corporation; USA; located at http://common1.csnimages.com/docresources/1742/0/8071.pdf.

* cited by examiner

DRY STEAM OVENS

CROSS-REFERENCE TO RELATED PATENT APPLICATIONS

This application is a continuation of U.S. application Ser. No. 13/742,982, filed Jan. 16, 2013 (now U.S. Pat. No. 9,149,058), which is incorporated herein by reference in its entirety.

BACKGROUND

Ovens can be used to cook food items. Steam can be an efficient medium for delivering cooking energy to a food item.

SUMMARY

One exemplary embodiment relates to a method of cooking a food item including supporting a food item having multiple cooking sites, providing a jet of dry steam from a steam nozzle, determining a targeted subset of the cooking sites, and dynamically moving the food item or the steam nozzle so that the jet of dry steam is directed onto the targeted subset of the cooking sites.

Another exemplary embodiment relates to an oven including a support structure configured to support a food item having multiple cooking sites and a steam nozzle movable with respect to the support structure to direct a jet of dry steam onto a targeted subset of the cooking sites.

Another exemplary embodiment relates to an oven including a steam nozzle configured to direct a jet of dry steam onto a food item having multiple cooking sites and a support structure configured to support the food item. The support structure is dynamically movable with respect to the steam nozzle to direct the jet of dry steam onto a targeted subset of the cooking sites such that movement of the support structure with respect to the steam nozzle varies in response to a cooking requirement of the food item.

Another exemplary embodiment relates to a method of cooking a food item including supporting a food item having multiple cooking sites, providing a jet of dry steam from a steam nozzle, determining a targeted subset of the cooking sites, and dynamically moving the steam nozzle relative to a support structure that supports the food item so that the jet of dry steam is directed onto the targeted subset of cooking sites.

Another exemplary embodiment relates to method of cooking a food item including supporting a food item having multiple cooking sites, providing a jet of dry steam from a steam nozzle, determining a targeted subset of the cooking sites, and dynamically moving a support structure that supports the food item relative to the steam nozzle so that the jet of dry steam is directed onto the targeted subset of the cooking sites.

Alternative exemplary embodiments relate to other features and combinations of features as may be generally recited in the claims.

The skilled artisan will understand that the drawings primarily are for illustrative purposes and are not intended to limit the scope of the inventive subject matter described herein.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Impacting a food item with dry steam is an efficient way to cook the food item. Upon impact with the food item, the dry steam condenses, delivering latent heat to the food item. For a food item including a number of possible cooking sites, a jet of dry steam can be directed over a targeted subset of the number of cooking sites to cook each of the targeted subset of cooking sites individually with the jet of dry steam. In this way, more than one cooking site is targeted by the jet of dry steam as the jet of dry steam moves among this targeted subset of cooking sites to cook each of the targeted cooking sites. The entirety of the food item (i.e., all of the cooking sites) can be cooked in this way or the jet of dry steam can be used to target specific cooking sites to be cooked differently than the rest of the food item (e.g., the dark meat found in the legs of the turkey may be cooked to a higher temperature than the white meat found in the breast of the turkey). The jet of dry steam can be used on its own to cook the food item or can supplement other sources of energy for cooking (e.g., microwaves, gas heating elements, resistive heating elements, convective heating, inductive cooking, high intensity light, etc.). Dry steam provides high heating rates due to the latent heat that can be transferred to the targeted cooking site, but reduces the risk of burning the food item at the targeted cooking site because of the relatively low temperature of the dry steam. The formation of a liquid water surface film on the food item can be avoided by setting the ambient temperature around the food item sufficiently above the boiling point of water.

Figure 1:
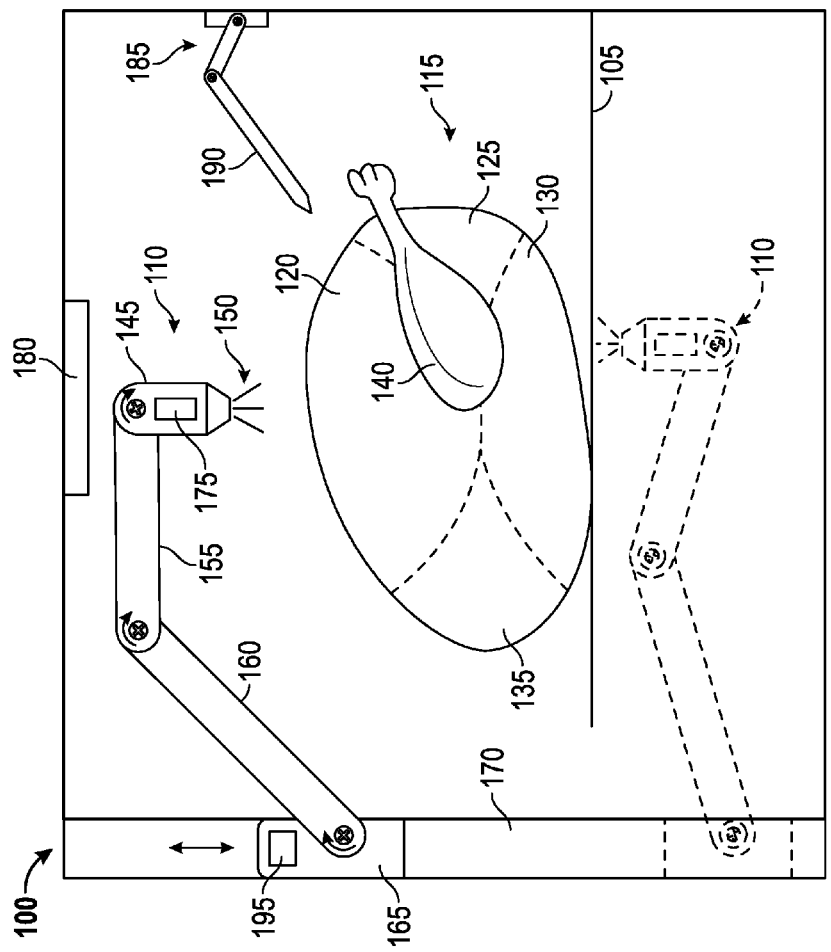
FIG. 1 is a schematic diagram of an oven according to an exemplary embodiment.

Referring to FIG. 1, an oven 100 according to an exemplary embodiment is illustrated. Oven 100 includes support structure 105 and a dynamically movable steam nozzle or source 110. Support structure 105 is configured to support at least one food item 115. For example, support structure 105 can be a rack, a spit, a skewer, a rod, a conveyor, or other structure suitable for holding, containing, piercing, or otherwise supporting one or more food items. Food item 115 includes a plurality of cooking sites 120, 125, 130, 135, and 140.

Movable steam nozzle 110 includes head or torch 145 that delivers jet of dry steam 150. Dry steam is supplied to the head 145 by a source of dry steam. Heating saturated steam at a constant pressure will increase the dryness of the saturated steam until the steam reaches 100% dryness. Further heating will produce superheated steam. In some embodiments, the source of dry steam is a boiler in combination with one or more heat exchangers.

Steam nozzle 110 can be pivoted or rotated with respect to support structure 105, translated with respect to support structure 105, or both, to allow jet of dry steam 150 to be directed over a targeted subset of cooking sites 120, 125, 130, 135, and 140. For example, steam nozzle 110 can be dynamically moved to target first cooking site 120 (shown in solid lines in FIG. 1) and then moved to target third cooking site 130 (shown in broken lines in FIG. 1). In this example, cooking sites 120 and 130 would be the targeted subset of cooking sites. In other examples, the targeted subset of cooking sites includes more than two cooking sites and can include all of the plurality of cooking sites 120, 125, 130, 135, and 140. While five cooking sites 120, 125, 130, 135, and 140 are shown in FIG. 1 as an example, more or fewer cooking sites are possible on a given food item. Dynamically moving (e.g., nonuniformly moving, variably moving, adjustably moving, etc.) the steam nozzle 100 to target the plurality of cooking sites 120, 125, 130, 135, and 140 (e.g., targeting cooking sites in a non-sequential order, targeting cooking sites for different durations of time, providing a different quality of steam to different cooking sites, etc.) allows for more precise control of the cooking of the food item 115 as a whole and at the individual cooking sites 120, 125, 130, 135, and 140.

Movable steam nozzle 110 can have up to six degrees of freedom (i.e., translatable along x, y, and z axes and rotatable about x, y, and z axes), but has at least one degree of freedom (i.e., either translatable along an axis or rotatable about an axis). As shown in FIG. 1, steam nozzle 110 includes head 145, an arm consisting of first linkage 155 and second linkage 160, and base 165. Head 145 is pivotally coupled to first linkage 155, first linkage 155 is pivotally coupled to second linkage 160, and second linkage 160 is pivotally coupled to base 165. Base 165 is coupled to track 170 so that base 165 is translatable along track 170.

Steam nozzle 110 is configured to control the supply of jet of dry steam 150 by selectively activating jet of dry steam 150 as needed to cook food item 115. For example, jet of dry steam 150 can be turned off while steam nozzle 110 transitions between a position targeting first cooking site 120 and a position targeting third cooking site 130. As another example, jet of dry steam 150 can be pulsed on and off to control the amount of energy delivered to the targeted cooking site.

Steam nozzle 110 is also configured to vary one or more qualities of the dry steam supplied by dry steam jet 150. In some embodiments, steam nozzle 110 is configured to vary the amount of steam supplied by jet of dry steam 150 to a targeted cooking site. This amount can be varied either by varying the amount of steam leaving the nozzle (e.g., the volumetric flow rate), or by varying the amount impacting the target (e.g., varying the aimpoint, the spatial pattern, or the dwell time). In some embodiments, steam nozzle 110 is configured to vary the spatial pattern (e.g., the divergence) of steam supplied by jet of dry steam 150. In some embodiments, steam nozzle 110 is configured to vary the temperature of steam supplied by jet of dry steam 150. In some embodiments, steam nozzle 110 is configured to vary the aimpoint of the dry steam jet 115 relative to the targeted cooking site. In some embodiments, the steam nozzle 10 is configure to vary the dwell time of the dry steam jet 115 on the targeted cooking site.

Selective activation of the jet of dry steam 150 and varying one or more qualities of the steam allows for dynamically controlled spatial delivery of dry steam to cook food item 115. That is, each cooking site can be cooked differently. For example, different cooking sites can be cooked differently to vary the texture of food item 115 at different cooking sites or to vary the doneness of different cooking sites.

In some embodiments, an oxidizer (e.g. hydrogen peroxide or $H_2O_2$) is used to augment the dry steam provided by steam nozzle 110 to increase the energy deliverable by jet of dry steam 150.

Different food items need are cooked in different ways. Food items can differ in the composition of the food item (e.g., beef, turkey, chicken, etc.) or differ within a type of food item (e.g., large turkey, small turkey, turkey breast only, free-range turkey, factory-farmed turkey, etc.). These differences from food item to food item require different approaches to cooking each food item.

In an exemplary embodiment, oven 100 cooks each food item using an approach involving determining which cooking sites will be targeted by the jet of dry steam 150. This determination is made in response to the cooking requirements for the food item. The cooking requirements can include one or more factors including the temperature of the food item, the visual appearance of the food item, the amount of water exiting the food item, the size of the food item, and the shape of the food item. The temperature of the food item can be a single temperature for the entire food item (e.g., the average of the temperature at each of a number of cooking sites), the temperature of the food item at each of the plurality of cooking sites, temperature differences between the cooking sites of a food item, and temperature differences between the cooking sites and a threshold temperature. The visual appearance of the food item as a whole or at individual cooking sites can be indicative of whether cooking is complete or the degree to which cooking is complete (e.g., the doneness of the food item, rare, medium, well done, etc.). The amount of water exiting the food item can also be indicative of whether cooking is complete. The amount of water exiting the food item typically increases as the food item cooks. The size of the food item (e.g., large or small) can require a change in the cooking approach. Likewise, the shape of the food item (e.g., thick or thin) can require a change in the cooking approach.

Oven 100 dynamically determines the targeted subset of cooking sites in response to the cooking requirements, resulting in dynamic control of the movement of the jet of dry steam 150 relative to food item 115. Determination of the targeted subset of cooking sites can be done prior to the start of cooking in response to the known cooking requirement for each food item 115 to be cooked in oven 100 or dynamically in response to changes in the cooking requirement as food item 115 cooks in oven 100. By dynamically selecting the targeted subset of cooking sites in response to changes in the cooking requirement, a feedback loop is established in which different cooking sites are cooked in response to changes in the cooking requirement (e.g., temperature, visual appearance, amount of water exiting food item, size, and/or shape).

Oven 100 determines the targeted subset of cooking sites based on the cooking requirements, which vary based on differences between individual food items and as food item 115 cooks. Oven 100 selectively activates jet of dry steam 150 as needed to cook food item 115 and varies one or more qualities of the steam supplied by jet of dry steam 150 as needed to cook food item 115. By dynamically controlling operation of oven 100 in response to cooking requirement of each individual food item 115, oven 100 will not perform identical cooking cycles for different food items unless the initial cooking requirements of two food items are identical and the cooking requirements of the two food items vary in the same manner during the cooking cycle. Dynamically controlling the cooking cycle allows oven 100 to cook each food item 115 in a manner tailored to that specific food item 115.

Oven 100 includes one or more sensors to detect a condition of food item 115, either as a whole or at each of the cooking sites. Sensor 175 is coupled to movable steam nozzle 110 for movement with steam nozzle 110. Sensor 180 is separate from the movable steam nozzle 110. Sensor 185 includes a probe 190 for contacting the food item or for insertion into the food item. Sensors 175, 180, and 185 may be temperature sensors configured to detect a temperature of food item, cameras or other visual imaging sensors configured to detect the visual appearance of food item 115 or the amount of water exiting food item 115, or physical characteristic sensors (e.g., force, weight, strain, torque, position) configured to detect size, shape, weight, or other physical characteristics of food item 115. Oven 100 may include one or more sensors of various types or one or more sensors of a single type.

In some embodiments, sensors 175 and 180 are remote temperature sensors that remotely detect (i.e., without physically contacting) the temperature of food item 115. Remote temperature sensors may be infrared or microwave sensors. In some embodiments, sensor 185 is a contact temperature sensor in which probe 190 contacts the surface of food item 115 to determine a surface temperature or in which probe 190 is inserted into the foot item 115 to determine an interior temperature. A surface temperature can also be detected remotely with a remote infrared sensor. An interior temperature can also be detected remotely with a remote microwave sensor.

In some embodiments, oven 100 also includes control unit or processing circuit 195 configured to control oven 100. Processing circuit 195 receives inputs and conducts the calculations necessary for oven 100 to function as intended. Further, processing circuit 195 receives and provides control signals to the various components of oven 100 as needed. For example, sensors 175, 180, and 185 provide inputs to processing circuit 195, which performs calculations based in part on these inputs, and then outputs control signals to movable steam nozzle 110. In an exemplary embodiment, processing circuit 195 includes a processor and memory device. Processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

In some embodiments, one or more of sensors 175, 180, and 185 detect a cooking site temperature for each of the cooking sites 120, 125, 130, 135, and 140 and processing circuit 195 determines temperature differences between the cooking sites 120, 125, 130, 135, and 140, which are used to determine the targeted subset of cooking sites. For example, in some embodiments, the cooking sites with the greatest temperature differences relative to the other cooking sites would make up the targeted subset of cooking sites so that the cooler cooking sites are cooked before the warmer cooking sites. In some embodiments, one or more of sensors 175, 180, and 185 detect a cooking site temperature for each of the cooking sites 120, 125, 130, 135, and 140 and processing circuit 195 determines temperature differences between each of the cooking sites 120, 125, 130, 135, and 140 and a threshold temperature, which are used to determine the targeted subset of cooking sites. The threshold temperature can be a targeted cooking temperature, for example, a minimum temperature to which food item 115 needs to be cooked to be safe to eat. For example, in some embodiments, the targeted subset of cooking sites are the cooking sites below the minimum safe cooking temperature.

In some embodiments, oven 100 is operated to perform a browning cycle in which a partially cooked food item 115 is browned such that the Maillard reaction takes place in the food item 115. The energy for the browning cycle can be provided by steam nozzle 110 or other source of cooking energy (e.g., a source of high intensity light such as visual or infrared light, a source of microwaves).

In some embodiments, oven 100 includes one or more additional movable steam nozzles similar to steam nozzle 110. A second steam nozzle is able to deliver a second jet of dry steam to a second targeted subset of cooking sites on food item 115. The second targeted subset of cooking sites can be the same as the first targeted subset (e.g., to increase energy delivered to the targeted subset, completely different than the first targeted subset (e.g., to cook the entirety of food item 115 faster than with a single steam nozzle), or share common cooking sites with the first targeted subset.

Figure 2:
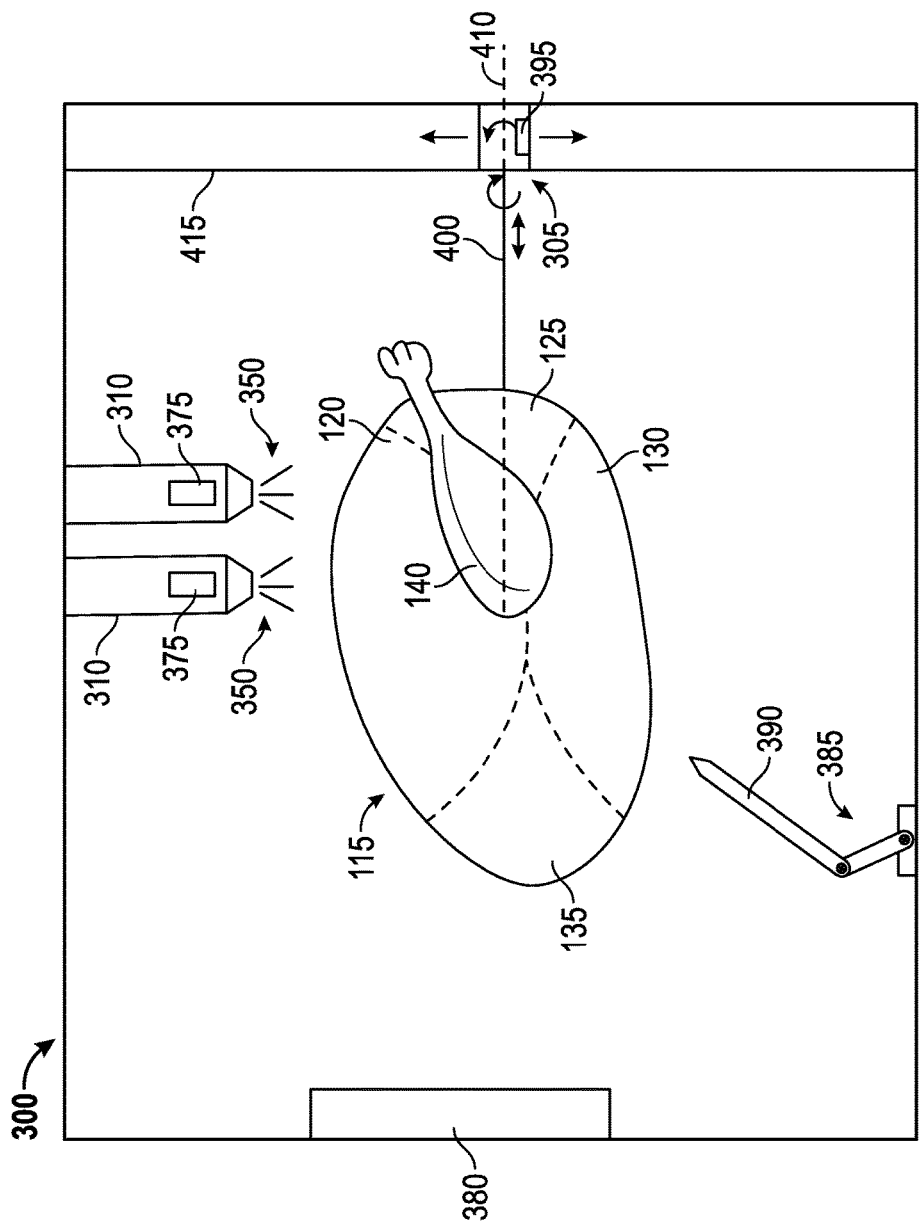
FIG. 2 is a schematic diagram of an oven according to another exemplary embodiment.

Referring to FIG. 2, an oven 300 according to an exemplary embodiment is illustrated. Oven 300 includes dynamically movable support structure 305 and stationary steam nozzle 310. Oven 300 is similar to oven 100 except that support structure 305 moves in relation to steam nozzle 310 rather than steam nozzle 110 moving in relation to support structure 105 as in oven 100. Accordingly, only the differences between oven 300 and oven 100 will be described in detail and components referred to by numerals in the 300s are similar to components referred to by similar numerals in the 100s.

Movable support structure 305 is configured to support food item 115. Steam nozzle 310 delivers a jet of dry steam 350. Movable support structure 305 can be pivoted or rotated with respect to steam nozzle 310, translated with respect to steam nozzle 310, or both, to allow jet of dry steam 150 to be directed over a targeted subset of cooking sites 120, 125, 130, 135, and 140. Movable support structure 305 can have up to six degrees of freedom (i.e., translatable along x, y, and z axes and rotatable about x, y, and z axes), but has at least one degree of freedom (i.e., either translatable along an axis or rotatable about an axis). As shown in FIG. 2, movable support structure 350 includes spit 400 and base 405. Spit 400 is pivotally coupled to base 400 so that spit 400 can rotate about longitudinal axis 410 and can rotate about a second axis perpendicular to longitudinal axis 400 as indicated by the arrows in FIG. 2. Base 405 is coupled to track 415 so that base 405 is translatable along track 415.

In some embodiments, oven 300 includes one or more additional steam nozzles 310. A second steam nozzle 310 is able to deliver a second jet of dry steam 350 to food item 115. The second steam nozzle can be located adjacent to the first steam nozzle or located opposite the first steam nozzle, among other possible locations within oven 300.

Figure 3:
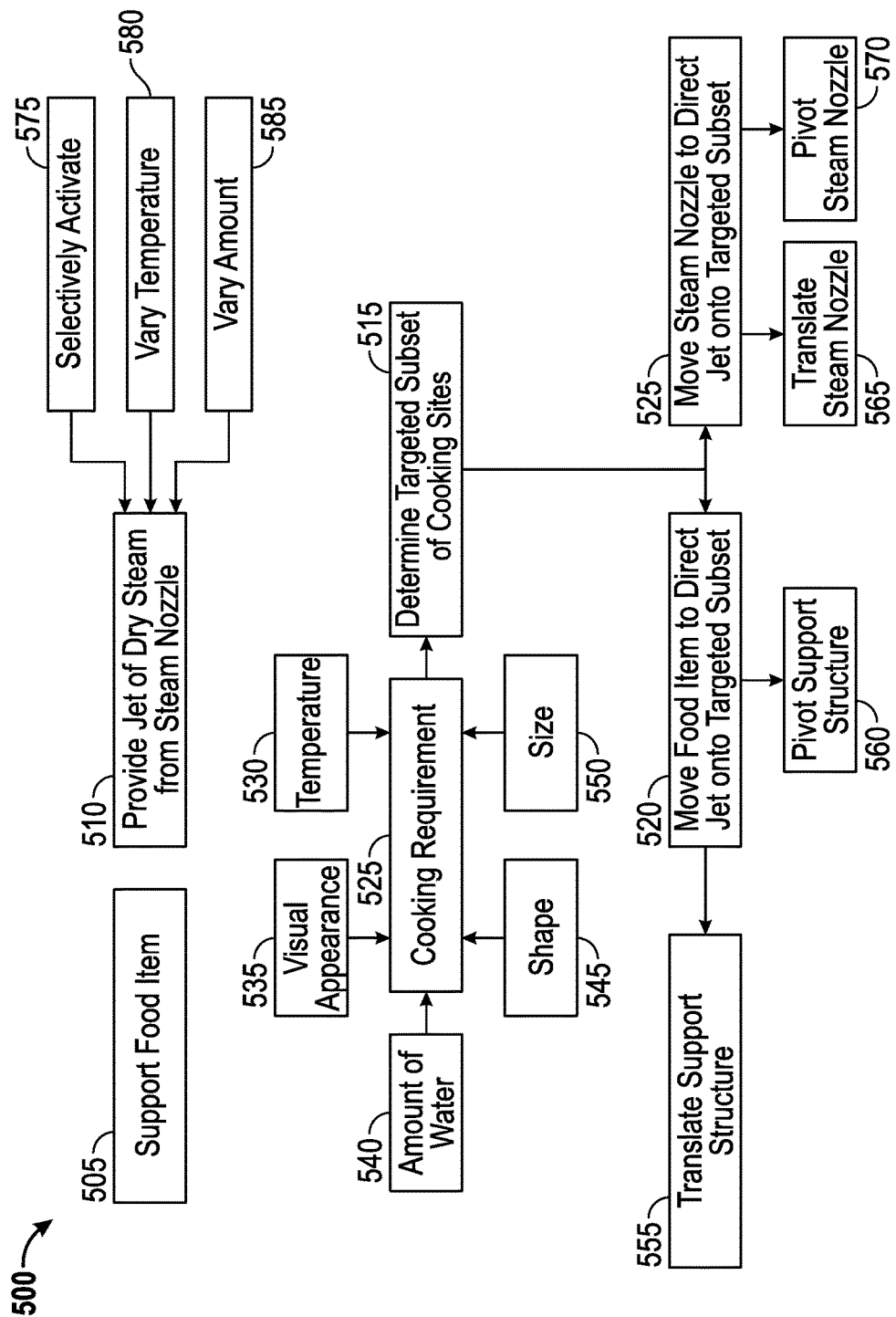
FIG. 3 is a flow chart illustrating a method of cooking a food item according to an exemplary embodiment.

Referring to FIG. 3, a method of cooking a food item 500 is illustrated according to an exemplary embodiment. For purposes of explanation, method 500 will be described with reference to oven 100 and oven 300, as appropriate. However, this is not intended to limit method 500 solely to implementation by ovens 100 and 300. For example, method 500 could also be implemented with oven 700 described in more detail below. First, support is provided for food item 115 (step 505). A jet of dry steam 150 or 350 is provided from steam nozzle 110 or 310 (step 510). From the plurality of cooking sites on food item 115, a targeted subset of cooking sites is determined (step 515). Either food item 115 is dynamically moved so that jet of dry steam 350 is directed onto the targeted subset of cooking sites (step 520) or steam nozzle 110 is dynamically moved so that jet of dry steam 150 is directed onto the targeted subset of cooking sites (step 525). In some embodiments, the subset of targeted cooking sites is determined based on a cooking requirement of food item 115 (step 525). The cooking requirement can include one or more factors including temperature (factor 530), visual appearance (factor 535), amount of water exiting food item (factor 540), shape (factor 545), and size (factor 550), as discussed above. Food item 115 can be moved (step 520) by translating support structure 305 that supports food item 115 (step 555) and/or by pivoting or rotating support structure 305 (step 560). Steam nozzle 110 can be moved (step 525) by translating steam nozzle 110 (step 565) and/or by pivoting or rotating steam nozzle 110 (step 570). The jet of dry steam 150 or 350 can be selectively activated as need to cook food item 115 (step 575), can vary in temperature (step 580), and/or can vary in amount of steam (step 585).

Figure 4:
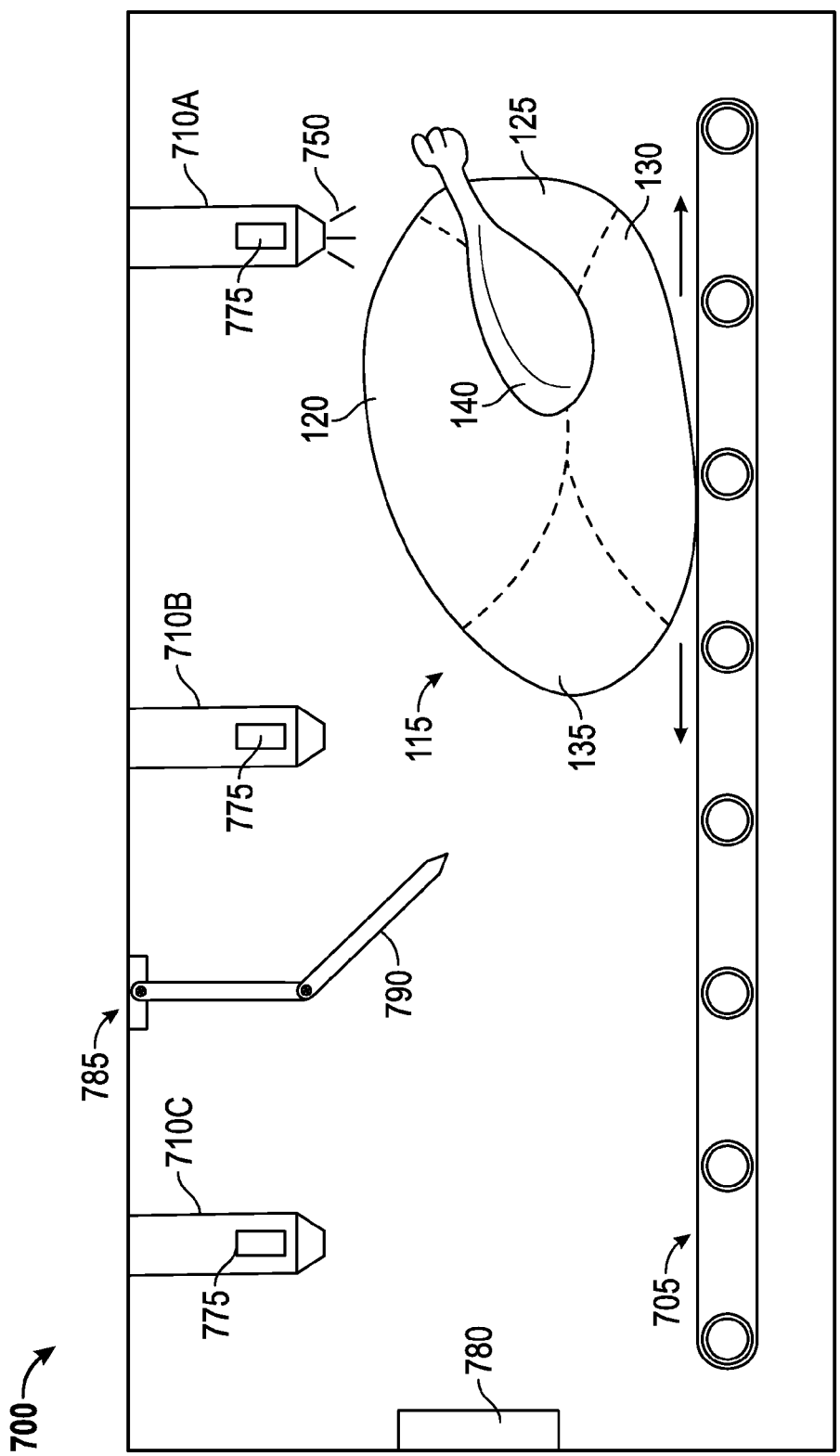
FIG. 4 is a schematic diagram of an oven according to another exemplary embodiment.

Referring to FIG. 4, an oven 700 according to an exemplary embodiment is illustrated. Oven 700 includes movable support structure 705 and a number of stationary steam nozzles 710A, B, and C. Oven 700 is similar to oven 100 except that support structure 705 dynamically moves in relation to steam nozzles 710A, B, and C rather than steam nozzle 110 dynamically moving in relation to support structure 105 as in oven 100. Accordingly, only the differences between oven 700 and oven 100 will be described in detail and components referred to by numerals in the 700s are similar to components referred to by similar numerals in the 100s.

Movable support structure 705 is configured to support food item 115. Multiple steam nozzles 710A, B, and C each deliver a jet of dry steam 750. In some embodiments, more steam nozzles are included. In other embodiments, as few as two steam nozzles are included. Movable support structure 705 is dynamically translatable with respect to steam nozzles 710A, B, and C (e.g., is a conveyor belt). As movable support structure 705 translates and causes food item 115 to pass beneath the steam nozzles 710A, B, and C, each of the steam nozzles 710A, B, and C is controlled to direct jet of dry steam 750 over a targeted subset of cooking sites 120, 125, 130, 135, and 140. Each of the steam nozzles 710A, B, and C can be dynamically turned on and off and/or vary a quality of the dry steam (e.g. temperature, amount) to cook the targeted subset of cooking sites as required. The movable support structure 705 can start, stop, and change the direction of its translation dynamically as needed to properly position the targeted subset of cooking sites under the appropriate steam nozzle 710A, B, and C. In some embodiments, steam nozzles are positioned opposite from one another with the movable support structure located between opposing steam nozzles.

In an additional exemplary embodiment, an oven can include both a movable support structure and a movable steam nozzle as described above.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An oven, comprising:
   a support structure configured to support a food item having a plurality of individual cooking sites;
   a steam nozzle configured to direct a jet of dry steam onto the food item; and
   a control system configured to determine a targeted subset of the individual cooking sites in response to a cooking requirement of the food item and configured to dynamically control movement of the support structure or the steam nozzle to direct the jet of dry steam onto the targeted subset of individual cooking sites in response to the cooking requirement of the food item so as to cook each of the targeted subset of individual cooking sites individually with the jet of dry steam.

2. The oven of claim 1, wherein the support structure is dynamically movable with respect to the steam nozzle.

3. The oven of claim 1, wherein the steam nozzle is dynamically movable with respect to the support structure.

4. The oven of claim 1, wherein the cooking requirement of the food item comprises a cooking requirement for the targeted subset of the cooking sites.

5. The oven of claim 1, wherein the cooking requirement includes a temperature of the food item.

6. The oven of claim 5, wherein the temperature of the food item comprises a temperature of at least one of the targeted subset of cooking sites.

7. The oven of claim 1 further comprising:
   a temperature sensor configured to detect the temperature of the food item.

8. The oven of claim 7, wherein the temperature sensor is operably coupled to the control system.

9. The oven of claim 7, wherein the temperature sensor is a remote temperature sensor configured to remotely detect the temperature of the food item.

10. The oven of claim 9, wherein the remote temperature sensor is one of an infrared sensor and a microwave sensor.

11. The oven of claim 7, wherein the temperature sensor is configured to contact the food item to detect the temperature of the food item.

12. The oven of claim 11, wherein the temperature sensor includes a probe configured to be inserted into the food item.

13. The oven of claim 7, wherein the temperature sensor is configured to detect a surface temperature of the food item.

14. The oven of claim 13, wherein the temperature sensor is one of an infrared sensor or a surface contact sensor.

15. The oven of claim 7, wherein the temperature sensor is configured to detect an interior temperature of the food item.

16. The oven of claim 15, wherein the temperature sensor is one of a microwave sensor and a probe sensor.

17. The oven of claim 1, wherein the cooking requirement includes temperature differences between the targeted subset of the cooking sites.

18. The oven of claim 1, wherein the cooking requirement includes a temperature difference between a temperature of the food item and a threshold temperature.

19. The oven of claim 1, wherein the cooking requirement includes time dependence of the temperature of the food item.

20. The oven of claim 1, wherein the cooking requirement includes the size of the food item.

21. The oven of claim 1, wherein the cooking requirement includes the shape of the food item.

22. The oven of claim 1, wherein the cooking requirement includes the visual appearance of the food item.

23. The oven of claim 1, wherein the cooking requirement includes the amount of water exiting the food item.

24. An oven, comprising:
   a support structure configured to support a food item having a plurality of individual cooking sites;
   a steam nozzle dynamically movable with respect to the support structure to direct a jet of dry steam onto a targeted subset of the individual cooking sites; and
   a control system configured to determine the targeted subset of the cooking sites in response to a cooking requirement of the food item and configured to cause dynamic movement of the steam nozzle to direct the jet of dry steam onto the targeted subset of individual cooking sites in response to the cooking requirement of the food item so as to cook each of the targeted subset of individual cooking sites individually with the jet of dry steam.

25. The oven of claim 24, wherein the steam nozzle is pivotable with respect to the support structure.

26. The oven of claim 24, wherein the steam nozzle is translatable with respect to the support structure.

27. The oven of claim 24, wherein the cooking requirement of the food item comprises a cooking requirement for the targeted subset of the cooking sites.

28. The oven of claim 24, wherein the cooking requirement includes a temperature of the food item.

29. The oven of claim 28, wherein the temperature of the food item comprises a temperature of at least one of the targeted subset of cooking sites.

30. The oven of claim 24 further comprising:
   a temperature sensor configured to detect the temperature of the food item.

31. The oven of claim 30, wherein the temperature sensor is operably coupled to the control system.

32. The oven of claim 30, wherein the temperature sensor is a remote temperature sensor configured to remotely detect the temperature of the food item.

33. The oven of claim 30, wherein the temperature sensor is configured to contact the food item to detect the temperature of the food item.

34. The oven of claim 30, wherein the temperature sensor is configured to detect a surface temperature of the food item.

35. An oven, comprising:
   a steam nozzle configured to direct a jet of dry steam onto a food item having a plurality of individual cooking sites;
   a support structure configured to support the food item, wherein the support structure is dynamically movable with respect to the steam nozzle; and
   a control system configured to determine a targeted subset of the individual cooking sites in response to a cooking requirement of the food item and configured to dynamically control movement of the support structure to direct the jet of dry steam onto the targeted subset of individual cooking sites in response to the cooking requirement of the food item so as to cook each of the targeted subset of individual cooking sites individually with the jet of dry steam.

* * * * *